(12) United States Patent
Westerman

(10) Patent No.: US 6,365,647 B1
(45) Date of Patent: Apr. 2, 2002

(54) PROCESS FOR PREPARING A POLYMERIC LATEX

(75) Inventor: Ira John Westerman, Wadsworth, OH (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 09/724,223

(22) Filed: Nov. 28, 2000

Related U.S. Application Data

(63) Continuation of application No. 09/237,512, filed on Jan. 26, 1999, now Pat. No. 6,184,287.

(51) Int. Cl.$^7$ .......................... C08F 2/24; C08F 257/02; C08F 273/00; C08L 41/00
(52) U.S. Cl. .................. 523/201; 524/458; 524/609; 524/817; 525/902; 526/80; 526/201; 526/287
(58) Field of Search ................. 523/201; 524/458, 524/609, 817; 525/902; 526/80, 287, 201

(56) References Cited

U.S. PATENT DOCUMENTS

| | | |
|---|---|---|
| 3,043,790 A | 7/1962 | Sanders |
| 3,895,953 A | 7/1975 | Mehta |
| 3,936,408 A | 2/1976 | Adams et al. |
| 3,943,996 A | 3/1976 | Guibault et al. |
| 4,015,991 A | 4/1977 | Persinski et al. |
| RE29,595 E | 3/1978 | Adams et al. |
| 4,086,201 A | 4/1978 | Peters et al. |
| 4,151,150 A | 4/1979 | Peters et al. |
| 4,202,809 A | 5/1980 | Eash |
| 4,427,819 A | * 1/1984 | Wessling et al. ............ 524/458 |
| 4,537,918 A | 8/1985 | Parcevaux et al. |
| 4,721,160 A | 1/1988 | Parcevaux et al. |
| 4,767,460 A | 8/1988 | Parcevaux et al. |
| 4,806,164 A | 2/1989 | Brothers |
| 5,099,922 A | 3/1992 | Ganguli |
| 5,258,428 A | 11/1993 | Gopalkrishnan |
| 5,274,027 A | 12/1993 | Guillaume et al. |
| 5,302,655 A | 4/1994 | Guillaume et al. |
| 5,588,488 A | 12/1996 | Vijn et al. |
| 5,750,618 A | * 5/1998 | Vogt et al. ................... 524/836 |
| 5,973,029 A | * 10/1999 | Hsu et al. ................... 523/201 |
| 6,028,135 A | * 2/2000 | Keller et al. ................ 524/458 |
| 6,171,388 B1 | 1/2001 | Jobbins |

* cited by examiner

Primary Examiner—Donald R. Wilson
Assistant Examiner—Kelechi Egwim

(57) ABSTRACT

A polymeric latex prepared by aqueous emulsion polymerization of a monomeric mixture comprising styrene and butadiene in the presence of a seed polymer prepared by aqueous emulsion polymerization of styrene and a salt of 2-acrylamido-2-methylpropanesulfonic acid.

6 Claims, No Drawings

PROCESS FOR PREPARING A POLYMERIC LATEX

This application is a continuation of U.S. patent application Ser. No. 09/237,512, entitled Polymeric Latexes With High Multivalent Ion Stability, filed Jan. 26, 1999, now U.S. Pat. No. 6,184,287 B1, the disclosure of which is hereby incorporated by reference in its entirety.

FIELD OF THE INVENTION

The present invention relates generally to polymeric latexes exhibiting outstanding tolerance to multivalent electrolytes. More particularly, the present invention relates to polymeric latexes with high multivalent-ion stability prepared by aqueous emulsion polymerization of a monomeric mixture in the presence of a seed polymer comprising styrene and the neutralized form of 2-acrylamido-2-methylpropanesulfonic acid. The latexes may be useful in the processing and recovery of natural resources in the mining, petroleum and geothermal industries as well as in paper and textile coatings and construction mixtures employing substantial amounts of inorganic pigments or fillers.

BACKGROUND OF THE INVENTION

Most commercial latexes are classified as anionic. This means that there is a negative charge on the latex particle. This negative charge can be produced in several ways: (1) using of anionic monomers such as carboxylic or sulfonic acids of their salts; (2) the normal incorporation of anionic initiator fragments derived from persulfates; and (3) adsorption of the anionic surfactants used to generate latex particles and stabilize their growth. Of course, like all salts there is an oppositely charged counterion that is relatively free in the water phase to keep the overall charge balanced.

The negative charge on the latex particle plays a crucial part in its keeping the latex stable. Electrostatic repulsion of the like (−) charges keep the particles from clumping together and forming larger clusters that eventually precipitate from the water phase.

Any variable that reduces the effective surface charge decreases the latex stability. Hence, adding simple salts to a latex can destabilize it. The cationic portion of a simple salt associates with the negative charges on the latex and reduces the overall charge at the particle surface. The effect of the cationic counterion depends upon both its concentration and its charge or valency. Thus multivalent cations are especially harmful in destabilizing anionic latex. The ionic strength is one measure of the destabilizing effect of a solution on latex. The product of the salt concentration and the square of the ionic charge determine the ionic strength; therefore, equamolar amounts of Na+, Ca++, and Al+++ have relative effects of 1, 4, and 9 respectively. By using both different multivalent salts and different concentrations, one can devise increasingly more severe latex stability tests and establish different echelons of latex stability.

The effect of temperature is also substantial. As the temperature increases, eventually the higher kinetic energy of the latex particles may allow them to overcome the electrostatic repulsion, collide and coalesce. Consequently, a combination of high electrolyte concentrations of multivalent cations and elevated temperatures constitutes an especially severe set of conditions for latex stability. Indeed, commercial latexes are considered "excellent" if they can withstand the slow addition of 10 mL of 2% calcium chloride to about 50 mL of latex, even at room temperature.

It is well known that as the temperature is increased then the stability of latex in the presence of salts is greatly reduced. For this reason, room temperature tests are used that call for much higher electrolyte concentrations than is actually encountered in an application so as to compensate for needing to function at higher temperatures. Also, adding a hot salt solution to hot latex is less convenient as a screening test.

In electrolyte stability testing, the amount of residue or grit that is generated when the latex is "shocked" by adding the salt solution is measured. Naturally, the identity of the salt and the strength of the salt solution determine the amount of residue produced. The rate of addition of the salt solution, stirring of the latex, etc. can also have an effect in discerning between borderline cases or similar stabilities. The amount of residue generated in the test is not to be confused with grit or residue that may be formed during the latex manufacturing. For this reason the latex is fist filtered free of fine grit prior to testing.

It will be appreciated from the foregoing that latexes having high multivalent-ion stability may be useful in the processing and recovery of natural resources in the mining, petroleum and geothermal industries as well as in paper and textile coatings and construction mixtures employing substantial amounts of inorganic pigments or fillers.

For example, techniques for drilling and completing wells, particularly gas and oil wells, are well established. Of chief concern here are those wells which are drilled from the surface of the earth to some subterranean formation containing a fluid mineral which it is desired to recover. After the fluid containing geologic formation is located by investigation, a bore-hole is drilled through the overlying layers of the earth's crust to the fluid containing geologic formation in order to permit recovery of the fluid mineral contained therein. A casing is then positioned within the borehole to insure permanence of the borehole and to prevent entry into the well of a fluid from a formation other than the formation which is being tapped. This well casing is usually cemented in place by pumping a cement slurry downwardly through the well borehole, which is usually accomplished by means of conducting tubing within the well casing. The cement slurry flows out of the open lower end of the casing at the well bottom and then upwardly around the casing in the annular space between the outer wall of the casing and the wall of the well borehole.

Gas channeling is a phenomenon that occurs during the setting of the cement slurry. Once the cement slurry begins to set, the hydrostatic pressure in the cement column begins to decrease. This reduction in hydrostatic pressure allows the channeling of gas. This phenomenon occurs during setting of the cement, from the time when setting has progressed enough for the hydrostatic pressure to no longer be transmitted, or to no longer be sufficiently transmitted through the cement, but not enough for the cement at the level of the gas pocket to oppose migration of the gas into the setting cement under the pressure from the gas pocket which at this point is no longer balanced by the hydrostatic pressure.

The pressurized gas then migrates through the cement slurry in the course of its setting and/or between the cement and the drilled formations, creating a multiplicity of channels in the cement, which channels may reach up to the surface of the well. It will be appreciated that gas channeling can be exacerbated by the cement's shrinkage and possibly by liquid losses from the cement slurry through filtration into the surrounding earth, especially in the area of porous formations, also termed "fluid loss".

Gas channeling is thus a serious drawback leading to weakening of the cement and to safety problems on the surface. Various styrene-butadiene latexes have been used as an additive for oil and gas well cementing, primarily to control gas channeling. For example reference is made to U.S. Pat. Nos. 3,895,953; 3,043,709; 4,151,150 and 4,721,160, incorporated herein by reference. It will be appreciated that cements typically include calcium, aluminum, silicon, oxygen and/or sulfur and which set and harden by reaction with water. These include those cements commonly called "Portland cements", such as normal Portland or rapid-hardening or extra-rapid-hardening Portland cement, or sulfate-resisting cement and other modified Portland cements, cements commonly known as high-alumina cements, high-alumina calcium-aluminate cements. Although the latexes heretofore used have been found to function, further improved latexes are desired in systems containing alum, calcium carbonate, gypsum, zinc oxide, aluminum calcium phosphate, natural high-hardness brines, and other multivalent inorganic materials.

It is an object of the present invention to provide a polymeric latex with high multivalent-ion stability. It is another object of the present invention to provide a styrene butadiene based latex functionalized with a sulfonated acrylamide monomer that exhibits high tolerance to multivalent electrolytes, even at elevated temperatures. Another object of the present invention is to provide a latex that may be useful in the processing and recovery of natural resources in the mining, petroleum and geothermal industries as well as in paper and textile coatings and construction mixtures employing substantial amounts of inorganic pigments of fillers. More particularly, it is an object of the present invention to provide a polymeric latex with high multivalent ion stability which is relatively inexpensive, and provides superior fluid loss control without adversely affecting other critical properties of the cement slurry for oil and gas well cementing. It is yet another object of the present invention to provide a polymeric latex useful as an additive for cement compositions for cementing wells. It has been discovered in accordance with the present invention, that a polymeric latex additive comprising styrene, butadiene and 2-acrylamido-2-methylpropanesulfonic acid when mixed with cement to form a slurry has the effect of limiting the porosity and blocking gas channeling. These and other objects and advantages will become more apparent from the following detailed description and examples.

SUMMARY OF THE INVENTION

Briefly, the present invention relates to a polymeric latex prepared by aqueous emulsion polymerization of a monomeric mixture comprising styrene and butadiene in the presence of a seed polymer prepared by aqueous emulsion polymerization of styrene and a salt of 2-acrylamido-2-methylpropanesulfonic acid.

Styrene butadiene based latexes functionalized with a sulfonated acrylamide monomer exhibit surprisingly high tolerance to multivalent electrolytes, even at elevated temperatures. Such latexes have potential utility in the processing and recovery of natural resources in the mining, petroleum and geothermal industries as well as in paper and textile coatings and construction mixtures employing substantial amounts of inorganic pigments or fillers.

DETAILED DESCRIPTION OF THE PREFERRED EMBODIMENTS

The present invention is directed to polymeric latexes comprising styrene, butadiene and the neutralized form of the monomer 2-acrylamido-2-methylpropanesulfonic acid, also commonly known as AMPS. AMPS is a registered trademark of The Lubrizol Company. The polymeric latexes in accordance with the present invention have been found useful as an additive to cementing compositions for oils, gas, and geothermal wells. Utility is also anticipated in applications which require stability of a latex binder in systems containing alum, calcium carbonate, gypsum, zinc oxide, aluminum calcium phosphate, natural high-hardness brines, and other multivalent inorganic materials.

The polymeric latexes in accordance with the present invention are prepared via a seeded polymerization of a monomeric mixture comprising styrene and butadiene using deionized water as a continuous phase, i.e., aqueous emulsion. The ratio of styrene to butadiene in the polymeric latex is typically about 2:1, although a somewhat higher or lower ratio may be used. Preferably, the polymeric latexes include about 30 to 80 weight percent styrene and about 20 to 70 weight percent butadiene.

The seed used in the aqueous emulsion polymerization is prepared by first copolymerizing an aqueous emulsion of a mixture of about 5 to 20 weight percent of styrene monomer, preferably about 8 to 12 weight percent of styrene monomer and from about 5 to 20 weight percent of the neutralized form of the monomer 2-acrylamido-2-methylpropanesulfonic acid, preferably about 5 to 10 weight percent. It will be appreciated that levels of the neutralized form of the monomer 2-acrylamido-2-methylpropanesulfonic acid above about 10 to 20 weight percent causes a broad particle size distribution. It has been found that the salts of 2-acrylamido-2-methylpropanesulfonic acid provide superior electrolyte and high temperature resistance to the polymeric latexes in accordance with the present invention in contrast to the carboxylates, alcohols, phenolics and steric stabilizers typically used in emulsion polymerization.

The neutralized form of the monomer 2-acrylamido-2-methylpropanesulfonic acid may be formed by the neutralization of the acid monomer with an alkaline agent such as a source of sodium, calcium, magnesium, ammonium ions and the like to form the salt of 2-acrylamido-2-methylpropanesulfonic acid.

In an alternate embodiment, the seed may be formed by aqueous emulsion polymerization of a mixture of about 5 to 12 weight percent of styrene monomer and about 2 to 6 weight percent of butadiene monomer and from about 3 to 20 weight percent, preferably about 5 to 10 weight percent of the neutralized form of the monomer 2-acrylamido-2-methylpropanesulfonic acid. In yet another alternate embodiment, the seed may be formed by aqueous emulsion polymerization of a mixture of about 5 to 10 weight percent of styrene monomer and about 2 to 6 weight percent of butadiene monomer and from about 3 to 10 weight percent, preferably about 3 to 5 weight percent of the neutralized form of the monomer 2-acrylamido-2-methylpropanesulfonic acid and about 2 to 5 weight percent seed comonomer.

The seed comonomer allows the polymeric latex to reach a stability equivalent to formulations containing higher concentration levels of the neutralized form of 2-acrylamido-2-methylpropanesulfonic acid. The seed comonomers may be selected from acrylonitrile, preferably mildly hydrophobic acrylamides such as methacrylamide, N-isopropyl- and N-t-butyl acrylamide, and N-(1,1-dimethyl-3-oxobutyl)acrylamide. Also effective as a seed comonomer are di(meth)acrylates with ethylene oxide spacer units in the 5–20 range. Less preferred seed comonomers are C1–C3 (meth)acrylates. It will be appreciated that acrylamide has been found ineffective as a seed comonomer and deleterious to polymeric latex production.

The above monomers are polymerized in the presence of water, free radical initiators, anionic surfactants, and chelating agents to form the latex binder of the present invention using conventional emulsion polymerization procedures and techniques except as otherwise provided herein.

The free radical initiators utilized to polymerize the monomers of the present invention include sodium persulfate, ammonium persulfate, potassium persulfate and the like. Other free radical initiators can be utilized which decompose or become active at the polymerization temperature such as various peroxides, e.g., cumene hydroperoxide, dibenzoyl peroxide, diacetyl peroxide, dodecanoyl peroxide, di-t-butyl peroxide, dilauroyl peroxide, bis(p-methoxy benzoyl)peroxide, t-butyl peroxy pivalate, dicumyl peroxide, isopropyl percarbonate, di-sec-butyl peroxidicarbonate, various azo initiators such as azobisdimethylvaleronitrile, 2,2'-azobisisobutyronitrile, 2,2'-azobis(2-amidinopropane)dihydrochloride, 2,2'-azobis-2-methyl-butyronitrile, 2,2'-azobis(methylisobutyrate), and the like and mixtures thereof. The amount of the free radical initiator is generally from about 0.1 to 2, and preferably from about 0.5 to 1.0 parts by weight per 100 parts by weight of the total amount of monomers added.

Optional chain transfer agents include mercaptans such as the alkyl and/or aryl(alkyl)mercaptans having from about 8 to about 18 carbon atoms and preferably from about 12 to about 14 carbon atoms. The tertiary alkyl mercaptans having from about 12 to about 14 carbon atoms are highly preferred. Examples of specific chain transfer agents include n-octyl mercaptan, n-dodecyl mercaptan, t-octyl mercaptan, t-dodecyl mercaptan, tridecyl mercaptan, tetradecyl mercaptan, hexadecyl mercaptan and the like, as well as mixtures thereof. The amount of the chain transfer agent utilized is from about 0.2 to 2.5, preferably from about 0.5 to 1.5 parts by weight per 100 parts by weight of the total amount of monomers added.

The anionic surfactants include sodium dodecylsulfate, sodium dodecylbenzene sulfate, sodium dodecylnaphthalene sulfate, dialkylbenzenealkyl, sulfates, sulfonates and the like, especially preferred is the dihexyl ester of sodium sulfosuccinate. The amount of anionic surfactant present is sufficient to obtain an aqueous emulsion of the monomers. Such an amount is typically from about 0.5 to 1.5 parts by weight per 100 parts by weight of the total amount of monomers added. It will be appreciated that the present invention does not require the presence of additional stabilizers, ionic surfactants, stabilizing surfactants such as ethoxylates sulfonates and the like in order to attain the high electrolyte tolerances needed.

Chelating agents may also be used during polymerization to tie up various metal impurities as well as to achieve a uniform polymerization. Examples of specific chelating agents include ethylene diamine tetra-acetic acid, nitrilotri-acetic acid, citric acid, and their ammonium, potassium and sodium salts. The amounts of the chelating agents may range from about 0.01 to 0.2 parts by weight per 100 parts by weight of the total amount of monomers added.

The polymerization process is effected by the selective addition of the various reactants in multiple stages to the reaction zone of a reactor as the reaction continues. The polymerization process is generally carried out from about 120 to 200 degrees F., and preferably from about 150 to 170 degrees F.

The process includes the step of forming a first polymeric seed by charging into the reaction zone of the reactor an aqueous emulsion polymerizable mixture of one or more emulsion polymerization monomers as described above, the neutralized form of 2-acrylamido-2-methylpropanesulfonic acid, surfactant, chelating agent and initiator. The neutralized form of 2-acrylamido-2-methylpropanesulfonic acid must be added in the seed step along with the comonomers at a pH greater than 4.5, preferably about 6 to 9 to be effective.

In a preferred embodiment, the anionic surfactant, chelating agent and neutralized form of 2-acrylamido-2-methylpropanesulfonic acid and one or more emulsion polymerizable monomers, are first added to the reactor, heated to about 150 degrees F. and then an aqueous mixture of free radical initiator is added. The aqueous reactants are allowed to react and then the temperature is increased to about 170 degrees F.

Subsequently, aqueous emulsion polymerizable mixtures including at least one polymerizable monomer, about 0.5 to 2.0 wt. chain transfer agent and about 0 to 5 wt. surfactant are charged to the reaction zone of the reactor over a plurality of stages. In a preferred embodiment, the aqueous polymerizable mixtures are charged to the reactor in a batch at a rate faster than the polymerization rate over about six separate stages such that after each charge the mixture is allowed to react within the reactor. The additional stages include an aqueous polymerization mixtures of styrene, butadiene and chain transfer agent and optionally surfactant to stabilize growing particles. The emulsion polymerizable mixture is then allowed to react in the reactor to high conversion, preferably from 97% to nearly quantitative yield.

The invention will be further clarified by a consideration of the following examples, which are intended to be purely exemplary of the invention. As used in the Examples, Iam=N-Isopropylacrylamide; tBAm=N-t-butylacrylamide; Mam=methacrylamide; Peg-600DMA=A dimethylacrylate crosslinker with '13 ethylene oxide units; TEGDMA=A dimethylacrylate crosslinker with '3 ethylene oxide units; DAAm=diacetoneacrylamide; HMPA=hydroxypropylacrylate; MA=methylacrylate; EA=ethylacrylate; MMA=methylmethacrylate; ACN=acrylonitrile; NaSS=the sodium salt of styrene sulfonic acid; Na=sodium salt; NH4=ammonium salt; NaAMPS=the sodium salt of 2-acrylamido-2-methylpropanesulfonic acid; Bd=1,3-butadiene, and SBA=styrene, butadiene, acrylontrile.

EXAMPLE 1

A one-gallon stainless steel pressure reactor equipped with monomer addition ports, stirrer and temperature and pressure measurement devices was used. Cooling was provided by an external water bath. The amounts provided below are based on a given concentration of reagent.

A mixture of deionized water 1515 g, ammonium hydroxide (28%) 11.3 g, 2-acrylamido-2-methylpropanesulfonic acid 36 g, Citrosol (50%) 3.3 g, hampene Na3 (40%) 1.5 g, Aerosol MA-80 (80%) 20.7 g, styrene 105 g and acrylonitrile 60 g was added to the reactor and then heated to 150 degrees F. Citrosol is a solution of citric acid and a registered trademark of Archer Daniels Midland Company. Aerosol is a registered trademark of American Cyanamide Company. Aerosol MA is a surfactant/wetting agent used for reducing the interfacial tension between liquids and solids or between two immiscible liquids. A solution of ammonium persulfate 6.5 g in deionized water 58.5 g was then added to the reactor. After 30 minutes the reactor temperature was increased to 170 degrees F. and then the following polymerizable mixtures identified in stages in Table 1 below were sequentially added every 30 minutes.

TABLE 1

|  | Weight, grams |
|---|---|
| Stage 1 | |
| Styrene | 112 |
| Sulfole 120 | 1 |
| Butadiene | 52 |
| Stage 2 | |
| Styrene | 112 |
| Sulfole 120 | 1 |
| Butadiene | 52 |
| Stage 3 | |
| Styrene | 112 |
| Sulfole 120 | 1 |
| 2-Hydroxyethylacrylate | 8 |
| Butadiene | 52 |
| Deionized water | 27 |
| Stage 4 | |
| Styrene | 112 |
| Sulfole 120 | 1 |
| 2-Hydroxyethylacrylate | 8 |
| Butadiene | 52 |
| Deionized water | 27 |
| Stage 5 | |
| Styrene | 112 |
| Sulfole 120 | 1 |
| Butadiene | 52 |
| Stage 6 | |
| Styrene | 112 |
| Sulfole 120 | 1 |
| Butadiene | 52 |

Sulfole is a registered trademark of Phillips Petroleum Company for mercaptans.

After the addition of the polymerizable mixture of Stage 6 to the reactor, the polymerizable mixture was then reacted in the reactor until constant solids of about 40 to 42%. The conversion of monomers to polymer was about 98%.

Ammonium hydroxide (28%) 23 g, deionized water 66 g, ammonium persulfate 1.2 g were added to the reactor and allowed to reactor for 90 minutes and then deionized water 65 g, ammonium persulfate 2.4 g and Drew L198 1.8 g were added to the reactor and allowed to react for 30 minutes then cooled and transferred to a stripping vessel and steam stripped and filtered in a conventional manner. Drew L198 is a blend of mineral oil, silica and alkoxylated fatty derivatives from Ashland Chemical Company. Bostex 490-B AO is an antioxidant supplied by Akron Dispersion Inc. as well known in the art. Bostex 490-B AO is an aqueous mixture of ditridecyl thiodipropionate, 4-methyl phenol and reaction product of dicyclopentadiene and isobutylene, sodium dodecylbenzene sulfonate.

The post stripping addition is provided below in Table 2.

TABLE 2

| Post Stripping | Weight, grams |
|---|---|
| Ammonium hydroxide (28%) | 19.2 |
| Bostex 490-B AO (35%) | 6.2 |
| Proxel (25%) | 12.0 |
| Deionized water | 36.0 |

Proxel is a registered trademark of Imperial Chemical Industries Limited and is a biocide for the preservation of latexes. The polymeric latex in accordance with the present invention has been found to be particularly useful as an additive for a cementing composition.

EXAMPLE 2

Latex samples were prepared in accordance with the present invention, filtered free of residue, and diluted 1:1 with a salt solution (3% NaCl) that was also spiked with 850 ppm calcium ions. This salt water latex suspension was placed in glass beverage bottle, capped, inserted into a metal bottle guard and rotated slowly in a thermostat water bath at 180 degrees F. for 24 hours. After the bottles cooled, the amount of residue was determined that was generated during the process. A standard latex will precipitate almost entirely.

The stability of the latexes was then tested. Electrolyte resistance or test severity is measured by the charge on the positive counterion-Al+++>Ca++>Na+. That is, testing with an Aluminum salt is much more severe than testing with a calcium salt. The amount and concentration of electrolyte solution added to the latex also measures stability. For example, adding 20 mL of 5% calcium chloride solution is more stringent than adding 40 mL of 2.5% calcium chloride solution because of the higher "shocking" (localized concentration) effect of the higher "strength" solution, even though the total amount of calcium ions is the same. Just adding more of the same strength solution is less discerning in differentiating between latex samples. Namely, adding 30 mL versus 20 mL of 2% calcium chloride is not as severe a test as adding a smaller amount of a more concentrated divalent salt solution.

The generalized test for electrolyte stability is as follows:

A. Filter 75 to 100 g of latex through a 325 mesh screen to provide a residue-free test sample.
B. Add enough latex to equal 25 g of dry polymer to a small beaker.
C. Add a magnetic stir bar to the beaker with latex and place it on a magnetic stir plate.
D. While the latex is stirring at a medium speed, add the amount of electrolyte solution (for example, 20 mL of 20 wt % $AlCl_3$) at a fast dropwise rate.
E. After all the electrolyte solution has been added, remove the beaker, dilute to 500 mL with distilled water [500–(mL latex+mL salt solution)].
F. Weigh a 100 mesh screen.
G. Filter the 500 mL of diluted latex through the preweighed 100 mesh screen.
H. Dry the screen & any residue formed in the test in an oven to constant weight. (2 hr @ 275 degrees F. is generally sufficient)
I. Determine the weight of residue on the screen and report as wt % dry residue on dry polymer solids. That is as a weight % based on the dry polymer.

The results of the test provided below in Table 3.

TABLE 3

| Latex/Seed Variation | AMPS[1] (phm) | Residue[2] Formed After 24 Hours @180 degrees F. |
|---|---|---|
| 1 SBA/AMPS + ACN in Seed | 3.0 | 0.00% |
| 2 SB/AMPS in Seed | 3.0 | 0.05% |
| 3 SBA/AMPS + ACN in middle of batch | 1.5 | 27.1% |
| 4 SB/Itaconic Acid in Seed | None | 87.5% |

[1]AMPS polymerized as the ammonioum salt. phm = the parts per 100 parts monomers based on the free acid of AMPS, 3.25 phm based on the ammonium AMPS.
[2]Residue is the grit captured by a 325 mesh standard screen.

Latexes 1 and 3 are styrene, butadiene, AMPS copolymers with a 5 phm acrylonitrile. Latexes 3 and 4 use 0.5 phm itaconic acid in the seed step, an ingredient that provides improved electrolyte stability compared to other carboxylic acid monomers. Entries with AMPS in the seed do not contain itaconic acid. Latex 4 is a styrene butadiene copolymer with the same butadiene level as the other entries. AMPS and AMPS+ACN variations are made by taking out part of the styrene in the recipe for Latex 4.

Latexes 1 and 2 versus Latex 4 show the significant improvement gained by copolymerizing with Ammonium AMPS in the seed. Also, Latex 4 shows the inability of a standard latex to function in hot brine as might be encountered in a geothermal well. Also, Latex 4 would be stable under these electrolyte concentrations at room temperature. Latex 4 is representative of a composition that does not possess the stability to withstand the lower echelon of electrolyte stability.

EXAMPLE 3

Latexes 1 and 2 from Example 2 were tested to determine the stability in calcium chloride and the effect of the comonomer in the seed. Calcium chloride was added slowly in 60 mL of each latex. The stability test was run at room temperature.

TABLE 4

| MI 2% CaCl2 | Latex 1 3.0 AMPS + 5.0 ACN in seed Residue Formed | Latex 2 3.0 AMPS in seed Residue Formed |
|---|---|---|
| 20.0 | 0.00 | 0.00 wt % |
| 30.0 | 0.00 | 1.40 |
| 40.0 | 0.00 | 75.0 |

Latex 1 is a copolymer of styrene butadiene using 8.75 phm styrene+5.0 phm acrylonitrile as seed monomers along with 3.0 phm of AMPS neutralized to the ammonium salt prior to polymerization.

Latex 2 is a copolymer of stryene butadiene using 13.75 phm styrene as the seed monomer along with 3.0 phm of AMPS neutralized to the ammonium salt prior to polymerization.

Table 4 shows a very slight different in stability between using acrylonitrile in the seed or leaving it out. This data, testing with larger amounts of electrolyte, clearly demonstrates the improved stability gained with the comonomer at this level of AMPS (3.0 phm based on AMPS or 3.25 phm based on the ammonium salt). Note, the ammonium salt is still used and not the free acid version.

EXAMPLE 4

Latexes were prepared in accordance with the present invention as provided below in Table 5. Latex 6 comprised 2.5 parts of AMPS added at the seed stage and then 2.5 parts of AMPS were added later during polymerization. In Latexes 7 and 8 all of the AMPS was added in the seed stage of the latex production. Residue levels in the 0.01 to 0.001% level is considered well within the acceptable range for most applications and do not necessarily reflect the onset of instability. Namely, such samples may show stability at a higher electrolyte severity when tested.

TABLE 5

| Seed Co-monomer | Seed AMPS | AMPS After Seed | Residue From 2% AlCl$_3$ | Residue From 10% CaCl$_2$ |
|---|---|---|---|---|
| Latex 5-None | 1.5 | 0 | Failed set-up | Failed set-up |
| Latex 6-None | 2.5 | 2.5 | 90%+ | 0.000 |
| Latex 7-None | 5.0 | none | 0.008% | 0.000 |
| Latex 8-5% Acrylonitrile | 5.0 | none | 0.000% | 0.000 |

Satin White, a calcium sulfate pigment, is notorious for destabilizing typical latex binders used in paper coatings. In spite of imparting excellent optical properties to coated paper, Satin White has seen limited use because of the lack of an effective, compatible latex binder. A screening test for latex compatibility with Satin White is the ability to withstand shocking by a 5 wt. % aqueous calcium chloride solution. Indeed, even higher stability, such as 10 wt. % calcium carbonate, may be required. Thus, latex binders comparable to Latex 6, 7 and especially 8 but also with a 1,3-butadiene content suitable for paper coating binders (about 30 to 60 wt. %) have utility in applications requiring high tolerance to multivalent electrolytes, such as in Satin White based paper coatings.

EXAMPLE 5

Eighteen different latex samples were prepared as provided below in Table 6. All latex samples contained 25.9 parts 1,3 butadiene and 1.3 parts of 2-hydroxyethylacrylate which were added in six increments after the seed reaction 3 to 5 phm of AMPS based on free acid monomer but polymerized as the ammonium salt; except for entries 24 and 25 which were polymerized as the sodium salt.

The effect of AMPS level and seed comonomer composition on AlCl$_3$ stability was then determined. 10 mL of 2% AlCl$_3$ was added slowly to 50 mL of each latex. The results are provided below in Table 6.

TABLE 6

| Latex | AMPS (phm) | Co-monomer | Co-monomer (phm) | Residue from 2% AlCl$_3$ |
|---|---|---|---|---|
| 9 | 3.0 | Iam | 5.0 | 0.000 |
| 10 | 3.0 | TBAm | 5.0 | 0.000 |
| 11 | 3.0 | Mam | 5.0 | 0.000 |
| 12 | 3.0 | Peg-600DMA | 5.0 | 0.000 |
| 13 | 3.0 | 600DMA | 5.0 | 8.80 |
| 14 | 3.0 | DAAm | 3.0 | 0.175 |
| 15 | 3.0 | DAAm | 2.5 | 1.14 |
| 16 | 3.0 | HMPA | 2.0 | 8.87 |
| 17 | 3.0 | TEGDMA | 5.0 | 13.67 |
| 18 | 3.0 | MA | 5.0 | set-up |
| 19 | 3.0 | EA | 5.0 | set-up |
| 20 | 3.0 | MMA | 2.5 | 11.81 |
| 21 | 4.0 | MMA | 5.0 | 1.26 |
| 22 | 4.5 | ACN | 5.0 | 0.000 |
| 23 | 5.0 | ACN | 5.0 | 0.000 |
| 24 | 5.0 | ACN | 0 | 0.008 |

TABLE 6-continued

| Latex | AMPS (phm) | Co-monomer | Co-monomer (phm) | Residue from 2% AlCl$_3$ |
|---|---|---|---|---|
| 25 | 5.0 | None | 0 | 0.000 |
| 26 | 3.0 | None | 0 | failed |

EXAMPLE 6

A one-gallon stainless steel pressure reactor equipped with monomer addition ports, stirrer and temperature and pressure measurement devices was used. Cooling was provided by an external water bath.

A mixture of deionized water 1600 g, Aerosol MA-80 (80%) 25.9 g Sodium Hydroxide (13%) 16.2 g, Sodium AMPS (50%) 300 g, Hampene Na3 (40%) 1.9 g, and styrene 131.2 g was added to the reactor. The reactor was evacuated under low pressure and filled with nitrogen twice. The reactor was heated to 150 degrees F. A solution of sodium persulfate 8.2 g in deionized water 75 g was then added to initiate polymerization of the seed stage. The seed stage used 8.75 phm (parts per 100 parts monomer) and 10 phm Sodium 2-Acrylamido-2-methylpropanesulfonate (NaAMPS). After 45 minutes the reactor temperature was increased to 170 degrees F. and the remaining monomers (81.25 phm) were added in 10 stages at 40 minute intervals so as to facilitate temperature control and heat removal. The first three (1–3) and last three stages (8–10) each consisted of the following: 1,3-butadiene 39 g, Sulfole-120 0.8 g, and styrene 80.8 g. While stages 4–7 each contained: styrene 80.9 g. 1,3-butadiene 39 g. Sulfole-120 0.8 g, deionized water 17 g, and 2-hydroxyethylacrylate 5 g. A solution of sodium persulfate 2.7 g in deionized water 75 g was added to the reactor 40 minutes after the stage 10. Two hours later a mixture of sodium hydroxide (13%) 5.8 g. sodium persulfate 1.5 g, Drew L-198 defoamer 3.8 g, and deionized water 75 g was added. After 30 minutes of additional mixing, the latex was cooled and removed from the reactor. After stripping of residual monomers the latex was posted with the following: Proxel (25%) 15.0 g, Wingstay L (50%) 6 g, sodium hydroxide (13%) 6.5 g, and deionized water 30 g.

A series of latex samples were made according to Example 6. Each contained 8.75 phm styrene in the seed stage along with NaAMPS and any other seed monomer specified in Table 7. All contained 26 phm 1,3-butadiene added in stages 1–10 and 1.3 phm 2-hydroxyethylacrylate added in stages 4–7. The styrene added in stages 1–10 was adjusted according to variable seed amounts to keep the total monomers at 100 parts.

TABLE 7

| | Seed Monomers | | | Latex Stability | | Electrolyte Tolerance Residue from |
|---|---|---|---|---|---|---|
| Latex | NaAMPS (phm) | Other (phm) | Other variables | Coagulum wt % | Filter ability | 20 mL/ 20% AlCl3 |
| 27 | 5.00 | None | — | 0.02% | Good | 0.00% |
| 28 | 3.50 | 1.5 NaSS | — | 0.23% | Fair | 3.60% |
| 29 | 3.50 | None | 1.5 NaSS added stages 4–7 | 2.65% | Poor | 0.00% |
| 30 | None | 5.0 NaSS | — | (100%) | Latex failed | Not Measurable |
| 31 | 5.50 | None | — | 0.03% | Excellent | 0.00% |
| 32 | 5.5 | 5.0 tBAm | — | 0.04% | good | 0.00% |
| 33 | 7.5 | 5.0 Bd | — | 0.04% | good | 0.00% |
| 34 | None | 7.5 NaSS | — | (100%) | Latex failed | Not Measurable |
| 35 | 10.0 | None | — | 0.10% | Excellent | 0.00% |
| 36 | 10.0 | 5.0 Mam | — | 0.09% | Good | 0.00% |
| 37 | 12.5 | None | — | 0.03% | Excellent | 0.00% |
| 38 | 15.0 | None | — | 0.15% | Good | 0.015% |
| 39 | 17.5 | None | — | 0.10% | Good | 0.004% |
| 40 | 20.0 | None | — | 0.32% | Fair | 0.004% |

It was surprising to find that up to 20 phm of a water soluble monomer such as NaAMPS can be added to the seed stage and still make an acceptable latex. See latexes 35, 37, 38, 39, 40 and 41.

Latexes 30 and 31 show that under the same conditions that work for NaAMPS another common sulfonate monomer NaSS, sodium styrene sulfonate, does not allow a latex to be made. Moreover, comparing latex 27 to latex 28 indicates that adding NaSS in the seed detracts from the electrolyte tolerance versus an equal weight of NaAMPS. Latex 29 shows that NaSS does not detract from the electrolyte tolerance if added later in stages 4–7. Latexes 28, 29, 30, and 31 all show the advantages of using NaAMPS exclusively as the sulfonate monomer.

Latexes 32, 33, and 36 show that additional comonomers can still be added to the seed in combination with higher NaAMPS levels. However, unlike the latex samples using 2.5 to 4.5 phm NaAMPS in the seed, we have not detected additional stability associated with these comonomers. This is because the NaAMPS samples in the range of from 5 to 12.5% are so stable. Likewise, we cannot at this time show an advantage for increasing the NaAMPS level in the seed beyond about 12.5 phm. In both cases extremely severe electrolyte tolerances may be required in specialized applications where the advantages of higher NaAMPS and/or in combination with comonomers will be seen. There is a distinct trend that increasing beyond about 12.5% NaAMPS reduces the latex filterability (an indication of fine residue).

Latex 33 was added simply as an example of using a comonomer. A 7.5 phm NaAMPS seed makes an excellent latex. Latex 33 still uses 26 phm Bd in stages 1–10 (that is, 31 phm total).

EXAMPLE 7

TABLE 8

| Latex | Seed Monomers | | Electrolyte Tolerance Residue from 40 mL of 20% AlCl3 |
|---|---|---|---|
| | AMPS (salt) | Comonomer | |
| 41 | 5.5 (Na) | None | 0.000% |
| 42 | 10.0 (NH4) | None | 0.000% |
| 43 | 5.4 (NH4) | 5.0 IAm | 0.000% |
| 44 | 5.5 (Na) | 5.0 IAm | 0.000% |
| 45 | 15.0 (Na) | None | 0.015% |

The seed monomers are monomers which in addition to 8.75 phm styrene are added to the seed stage. The remainder of the monomers were added in six stages as in Example 1 (same amounts of 1,3-butadiene and 2-hydroxyethylacrylate). Latex 42 differs in that 13.75 phm of styrene was added with 10 phm of ammonium AMPS in the seed; all others used 8.75 phm.

Table 8 shows that a number of latexes will withstand twice as much $AlCl_3$ as used in Table 7. This is an echelon of electrolyte tolerance that should be sufficient for all applications at ambient temperatures and most applications at the high temperatures where the effect of electrolytes becomes more stringent. Latex 42 shows that up to about 24 phm monomer can be used in the seed. Other entries show that various salts of AMPS are essentially equivalent.

EXAMPLE 8

Latexes were prepared in accordance with the present invention wherein a seed stage using styrene and other monomers as shown below was followed by ten monomer additions.

TABLE 9

| Sample | Bd (phm) | Sulfonate Monomer in Seed Step | Seed (other) | Added Later | Residue from 20 mL 20% AlCl3 |
|---|---|---|---|---|---|
| 46 | 60.0 | 5.0 NaAMPS | none | None | 0.2% |
| Latex failed in process | 60.0 | 5.0 NaSS | None | Latex coagulated | |
| 48 | 60.0 | None | 1.5 Itaconic acid | 5.0 NaSS in middle of process | 14.8% |

In Table 9, Latex 46 demonstrates that a high-butadiene latex can be made with outstanding electrolyte stability. That is, the process is not limited to low butadiene or high Tg materials. The latex that failed followed a standard AMPS recipe (Example 5) but tried to use another sulfonate monomer, sodium styrene sulfonate, in the seed step. This is important since it shows the specificity of the invention to AMPS salts.

Latex 48 shows that a measure of stability can be achieved with sodium styrene sulfonate but only if this monomer is restricted from the seed. Also, NaSS is far less effective on a weight basis and is currently more costly. Other data shows that NaSS can be used in combination with AMPS but that the efficiency is reduced versus using all AMPS, The latexes in accordance with the present invention have improved multivalention tolerance which is important for applications where the latex is used with fillers such as calcium carbonate. Carpet backing and paper coatings are two such applications. Furthermore, as shown above, the polymeric latexes in accordance with the present invention have been found to have improved multivalent electrolyte and high temperature stabilities over typical styrene-butadiene latexes.

The cement forming part of the cementing composition can be taken from any class of common hydraulic cements routines used to cement oil and gas wells. The term "hydraulic cement" is used to designate cements which contain compounds of calcium, aluminum, silicon, oxygen and/or sulfur and which set and harden by reaction with water. These include those cements commonly called "Portland cements", such as normal Portland or rapid-hardening or extra-rapid-hardening Portland cement, or sulfate-resisting cement and other modified Portland cements, cements commonly known as high-alumina cements, high-alumina calcium-aluminate cements; and the same cements further containing small quantities of accelerators or retarders or air-entraining agents, as well as Portland cements containing secondary constituents such as fly ash, pozzolan and the like.

The amount of polymeric latex added to the cement may be varied as desired. The polymers are generally added in an amount of from about 5 to 30 percent based on the weight of the cement. In a preferred embodiment, the polymeric latex comprises from about 10 to 20, most preferably, about 15 percent by weight of the cement. Generally, as the temperature and hardness of the wellbore fluids increase then more latex that must be used. However, for the current invention, owing to its stability, 15 to 20 percent latex is still effective under most temperatures and hardness levels encountered. The amount of water added on weight of cement (WOC) is about 35 to 50 percent, corrected for the amount of water in the latex. The latex may be diluted with the appropriate amount of water and added directly in the cement. It will be appreciated that since the polymeric latex is dispersed in the aqueous medium it is possible to use a high percentage of the polymer without imparting high viscosity to the cement slurry.

One or more defoamers may also be added to the cement composition. The defoamers are added for their deairentrainment properties imparted to the resulting cement composition. Any one of a number of defoamers available to those skilled in the art may be utilized. A suitable defoamer is available from BASF Corporation under the trademark PLURACOL® 4010. This is a polypropylene glycol with an average molecular weight of about 3300. The defoamer is typically added to the composition in an amount of from about 0.01 to 0.1% based on the weight of the cement.

In some instances certain other additives known as retarders or accelerators may be added to the cement composition to adjust the thickening time of the cement slurry for the drilling operation. These additives are often added in quantities of from about 0.5 to 1.5%. U.S. Pat. No. 4,537,918, incorporated herein by reference, describes many of the known accelerators and retarders available to those in the art. In addition to these additives certain other additives may also be used. For example, silica flour may be added in amounts of from about 30 to 35% by weight of the cement if the temperature of the oil well is greater than 220 degrees F. Since Portland cement experiences strength retrogression at high temperatures, silica flour can be added to increase the compressive strength of the cement composition.

The physical properties of the cement slurry compositions according to the various embodiments of the invention should be as follows: the fluid loss should be less than about 55 mL/30 minutes, preferably less than about 50 mL/30 minutes, and more preferably less than about 40 mL/30 minutes. The plastic viscosity of the composition should be less than about 100 cp, and more preferably less than about 50 cp. Additionally, the yield point should be less than about 20 lbs./100 ft$^2$. The free water value should be less than or equal to about 3.

It has been observed experimentally that the presence of the polymeric latex in accordance with the present invention improves the control of gas channeling in the cemented annulus.

The patents and documents described herein are hereby incorporated by reference.

Having described presently preferred embodiments of the invention, the invention may be otherwise embodied within the scope of the appended claims.

What is claimed is:

1. A semi-batch aqueous emulsion polymerization process for preparing a polymeric latex having high multivalent ion stability comprising the steps of:

preparing a polymer seed by aqueous emulsion polymerization of styrene and a salt of 2-acrylamido-2-methylpropanesulfonic acid; and polymerizing a monomeric mixture of styrene, butadiene, and optionally a nonionic monomer in the presence of the polymer seed, whereby the monomeric mixture is added in stages.

2. The process of claim 1, wherein the monomeric mixture is added in about 3–16 stages.

3. The process of claim 1, wherein the pH during the preparation of the seed polymer is about 4.5.

4. The process of claim 1 wherein the pH during the preparation of the seed polymer is between 6–9.

5. The process of claim 1 wherein the seed polymer is prepared with 0.8 to 1.6 phm of the salt of the dihexylester of sulfosuccinic acid as the primary emulsifier.

6. The process of claim 5 wherein the seed polymer is prepared with 0.8 to 1.6 phm of the salt of the dihexylester of sulfosuccinic acid as the sole emulsifier.

* * * * *

UNITED STATES PATENT AND TRADEMARK OFFICE
CERTIFICATE OF CORRECTION

PATENT NO. : 6,365,647 B1
DATED : April 2, 2002
INVENTOR(S) : Westerman

It is certified that error appears in the above-identified patent and that said Letters Patent is hereby corrected as shown below:

<u>Title page,</u>
Item [*] Notice, delete the phrase "by 0 days" and insert -- by 74 days --

Signed and Sealed this

Eighteenth Day of May, 2004

JON W. DUDAS
*Acting Director of the United States Patent and Trademark Office*